US009502782B2

(12) United States Patent
Leis et al.

(10) Patent No.: US 9,502,782 B2
(45) Date of Patent: Nov. 22, 2016

(54) SYSTEM AND METHOD FOR TRANSMITTING POWER THROUGH A PLUG-IN UNIT

(71) Applicant: ROCKWELL AUTOMATION TECHNOLOGIES, INC., Mayfield Heights, OH (US)

(72) Inventors: Kenneth K. Leis, Waukesha, WI (US); Dean Thomas Meyer, Oak Creek, WI (US); Paul T. Krause, Fredonia, WI (US); Troy M. Bellows, Racine, WI (US); Thomas J. Becker, Milwaukee, WI (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 344 days.

(21) Appl. No.: 14/049,925

(22) Filed: Oct. 9, 2013

(65) Prior Publication Data

US 2015/0099407 A1 Apr. 9, 2015

(51) Int. Cl.
| | |
|---|---|
| *H01R 4/18* | (2006.01) |
| *H01R 43/048* | (2006.01) |
| *H02B 1/36* | (2006.01) |
| *H02B 11/04* | (2006.01) |
| *H01R 13/10* | (2006.01) |
| *H02B 1/21* | (2006.01) |

(52) U.S. Cl.
CPC .............. *H01R 4/18* (2013.01); *H01R 13/10* (2013.01); *H01R 43/0484* (2013.01); *H02B 1/36* (2013.01); *H02B 11/04* (2013.01); *H02B 1/21* (2013.01); *Y10T 29/49185* (2015.01)

(58) Field of Classification Search
CPC ............................ H01R 43/0484; H01R 4/18
See application file for complete search history.

(56) References Cited

U.S. PATENT DOCUMENTS

| | | |
|---|---|---|
| 4,024,441 A | 5/1977 | Coyle et al. |
| 4,867,713 A | 9/1989 | Ozu et al. |
| 2006/0067018 A1 | 3/2006 | Malkowski, Jr. et al. |
| 2012/0064746 A1 | 3/2012 | Bellows et al. |

FOREIGN PATENT DOCUMENTS

| | | |
|---|---|---|
| EP | 2571121 A1 | 3/2013 |
| JP | H06-233421 A | 8/1994 |

OTHER PUBLICATIONS

Extended European Search Report for EP Application No. 14188253.0 mailed Mar. 11, 2015, 8 pages.

*Primary Examiner* — Briggitte R Hammond
(74) *Attorney, Agent, or Firm* — Fletcher Yoder, P.C.

(57) ABSTRACT

A stab for use in a plug-in assembly includes a stab piece and a lug. The stab piece includes one or more contact arms configured to engage a bus bar, and a base portion coupled to the one or more contact arms. The base portion is configured to be coupled to a stab shaft for rotating the stab about a rotational axis to transition the stab from a retracted position to an extended position. The lug is coupled to the stab piece and configured to receive wire for transmitting power from the bus bar to an electrical component. The lug is configured to be deformed around the wire to hold the wire when a crimping force is applied to the lug. The lug is configured to hold the wire at a position approximately centered on a rotational axis of the stab shaft when the lug is deformed by the crimping force.

18 Claims, 10 Drawing Sheets

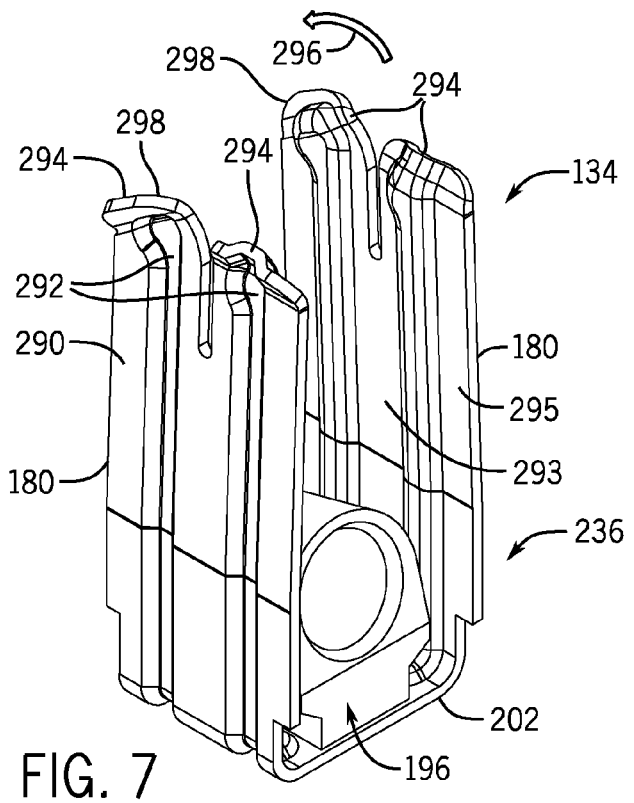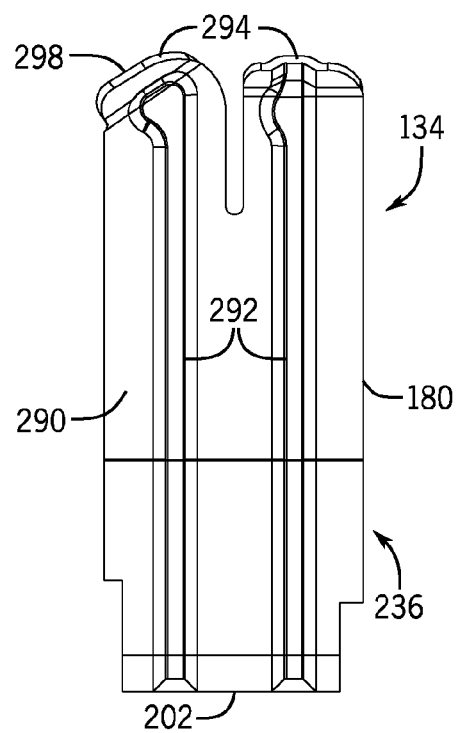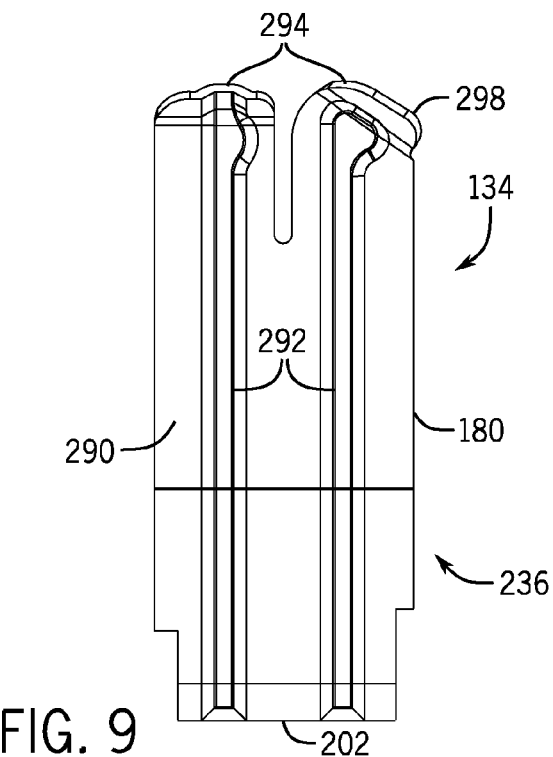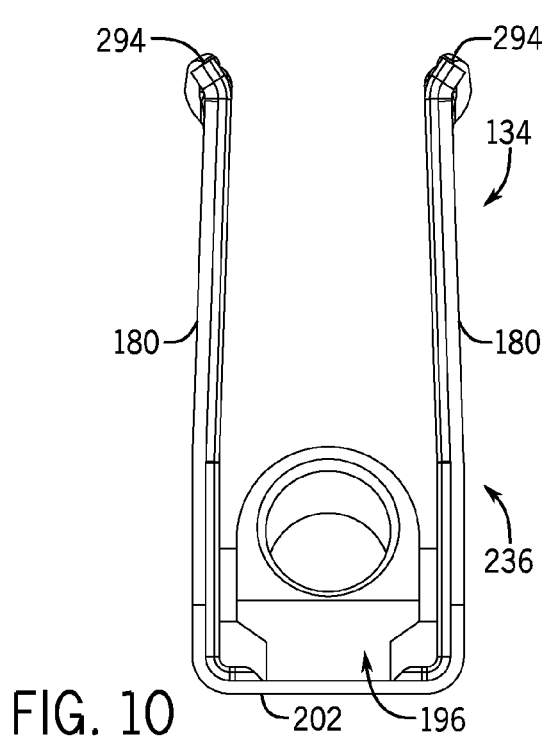
FIG. 7
FIG. 8
FIG. 9
FIG. 10

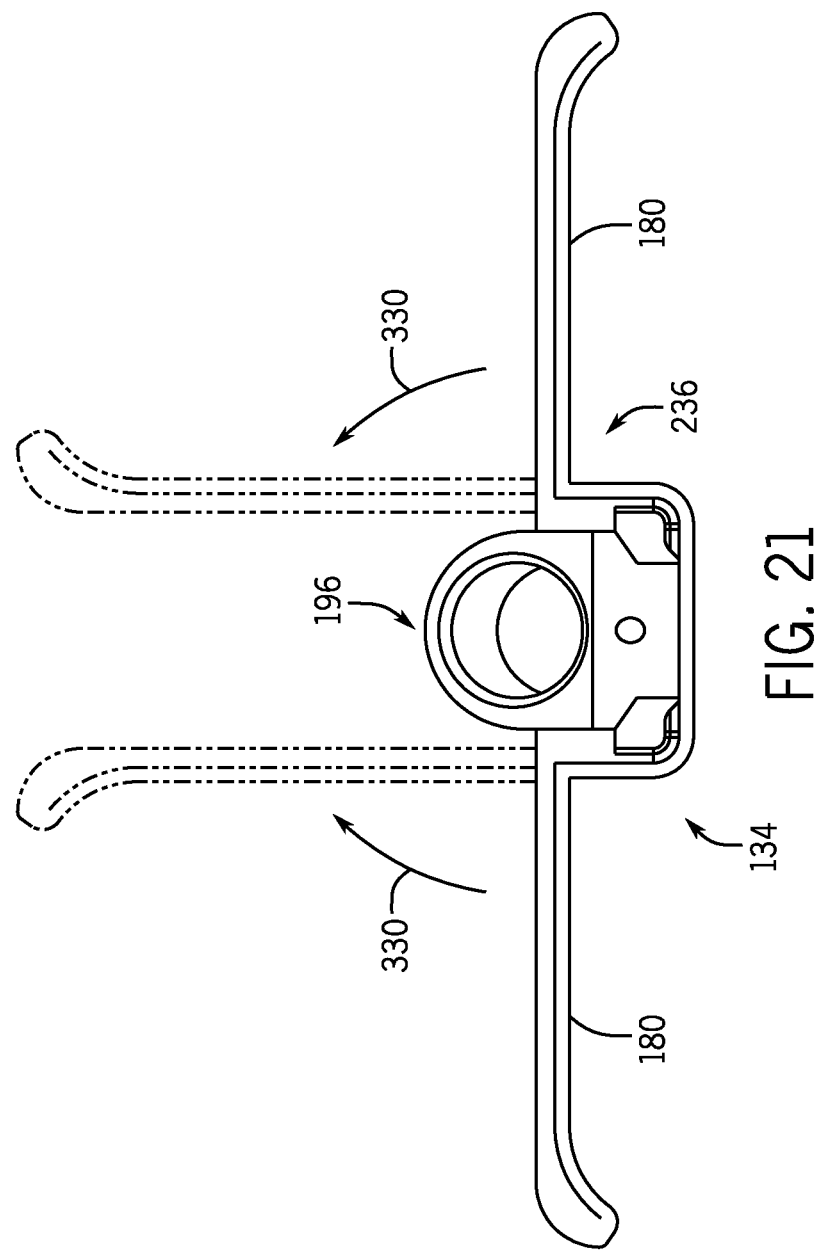

SYSTEM AND METHOD FOR TRANSMITTING POWER THROUGH A PLUG-IN UNIT

BACKGROUND

Techniques in accordance with present embodiments generally relate to motor control centers and, more particularly, to a system and method for transmitting high current power through unit line stabs of a plug-in unit.

A motor control center (MCC) is an enclosure that contains standard motor control equipment. MCCs can include columns and sections having plug-in units, or "buckets", which contain motor controls of the MCC. For example, an MCC plug-in unit may include transformers, variable frequency drivers, feeder circuit breakers, programmable controllers, and so forth. During operation, MCC plug-in units typically contain a live voltage. Indeed, it is common for an MCC plug-in unit to be coupled to a horizontal bus or a vertical bus within the MCC that distributes power across and within the various columns and sections of the MCC. For example, a typical MCC plug-in unit may have line contacts, or "stabs", that connect to the horizontal or vertical bus, thereby providing power to the MCC plug-in unit. Removing the presence of live voltage from traditional MCC plug-in units (e.g., removing the stabs from the horizontal or vertical bus) often includes opening the MCC plug-in unit to facilitate manual removal of the stabs from communicative coupling with the bus.

BRIEF DESCRIPTION

In one embodiment of the present techniques, a stab for use in a plug-in assembly is described. The stab includes a stab piece and a lug. The stab piece includes one or more contact arms configured to engage a bus bar, and a base portion coupled between the contact arms. The base portion is configured to be coupled to a stab shaft for rotating the stab about a rotational axis to transition the stab from a retracted position to an extended position. The lug is coupled to the stab piece and configured to receive one or more wires for transmitting power from the bus bar to an electrical component. The lug is configured to be deformed around the wire to hold the wire when a crimping force is applied to the lug. The lug is configured to hold the wire at a position approximately centered on a rotational axis of the stab shaft when the lug is deformed by the crimping force.

In a second embodiment, a plug-in unit includes at least one stab configured to engage a bus. The stab includes a stab piece and a lug. The stab piece includes two contact arms configured to engage a bus bar of the bus, and a base coupled between the two contact arms. The lug is coupled to the stab piece and is disposed around and coupled to wire to transmit power from the bus bar to an electrical component. The plug-in unit also includes a stab shaft coupled with the base of the stab. The stab shaft is configured to be rotated about a rotational axis to rotationally transition the stab from a retracted position to an extended position. The lug is configured to hold the wire at a position approximately centered on the rotational axis of the stab shaft.

In a third embodiment, a method for assembling a plug-in unit is described. The method includes disposing a wire in an opening of a lug. The wire is configured to transmit power from a bus bar to an electrical component. The lug forms part of a stab configured to engage the bus bar for transmitting the power from the bus bar to the wire, and the stab is configured to be rotated into or out of engagement with the bus bar via rotation about a rotational axis. The stab includes a stab piece and the lug, and the lug is coupled to the stab piece. The stab piece includes two contact arms configured to engage the bus bar and a base portion of the stab piece coupled between the contact arms. The method also includes crimping the lug to couple the lug with the wire such that the wire is approximately centered on the rotational axis.

DRAWINGS

These and other features, aspects, and advantages of the present invention will become better understood when the following detailed description is read with reference to the accompanying drawings in which like characters represent like parts throughout the drawings, wherein:

FIG. 7 is a perspective view of a unit line stab used in an MCC plug-in unit, illustrating a lug block for receiving and holding wire in accordance with an embodiment of the present techniques;

FIG. 8 is a left side view of the unit line stab of FIG. 7, in accordance with an embodiment of the present techniques;

FIG. 9 is a right side view of the unit line stab of FIG. 7, in accordance with an embodiment of the present techniques;

FIG. 10 is a front view of the unit line stab of FIG. 7, in accordance with an embodiment of the present techniques;

FIG. 21 is a schematic representation of a single-piece unit line stab with a lug block, in accordance with an embodiment of the present techniques.

DETAILED DESCRIPTION

The present disclosure is directed toward systems and methods for transmitting relatively high current power from bus bars to electrical components of a motor control center (MCC) via a plug-in unit having unit lines stabs configured to engage the bus bars. The unit line stabs may be coupled to a stab shaft, and the stab shaft may be rotated or displaced in a direction to transition the unit line stabs between engaged and disengaged positions relative to the respective bus bars. Each unit line stab of the plug-in unit includes one or more contact arms designed to contact opposite sides of a bus bar, a base portion located between and connecting the contact arms, and a lug block disposed on the base portion between the contact arms. The lug block may be configured to receive and hold wire for transmitting electricity from the bus bar to an electrical component of the MCC. In some embodiments, the wire may have a relatively large gauge, or a number of smaller gauges, in order to accommodate the current flowing through the wire. The lug block may be configured to hold the wire at a position approximately centered on a rotational axis of the stab shaft. This may minimize foreshortening and lengthening of the wire through the MCC as the unit line stab is transitioned between the engaged and disengaged positions. A crimping force may be applied to the lug block to secure the wire within the lug block. The lug block may include features designed to promote a desired deformation of the lug block when the crimping force is applied. Specifically, the lug block may be designed to deform such that the wire is approximately centered on an axis of the stab shaft when the crimping force is applied to couple the wire with the lug block.

Figure 1:
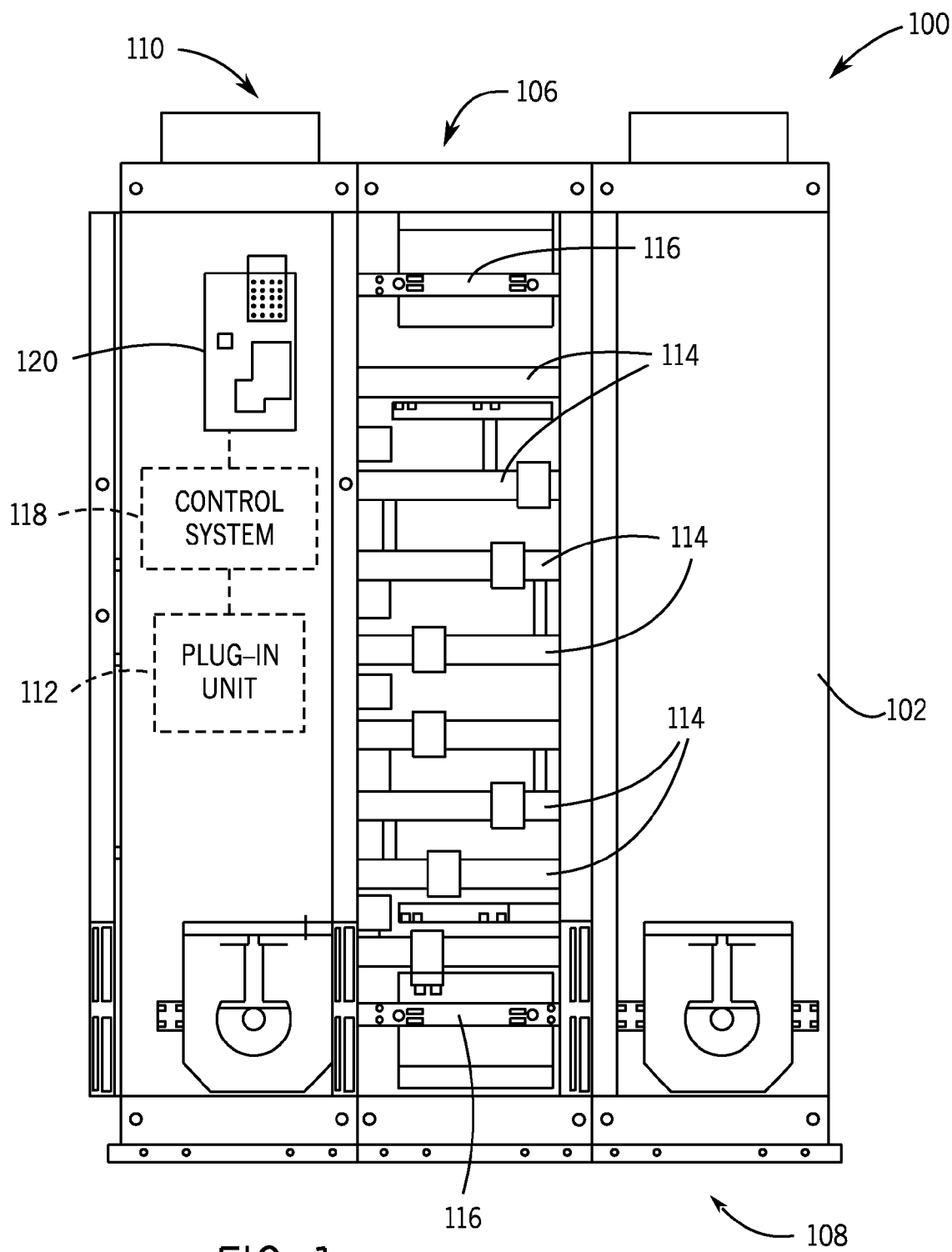
FIG. 1 is a front view of an embodiment of an electrical enclosure having an MCC plug-in unit including a stab assembly having a plurality of unit line stabs in accordance with an embodiment of the present techniques.

Turning now to the drawings and referring to FIG. 1, an electrical enclosure 100 is illustrated in which electrical components of various types may be housed and connected via a bus system. The electrical enclosure 100 may be representative of a motor control center (MCC) or other industrial, commercial, or marine electrical system. In general, the electrical enclosure 100 provides a protective shell around various electrical components and the bus system. For example, the electrical enclosure 100 may include a shell 102 made of any suitable material, such as heavy gauge sheet metal, reinforced plastic, and so forth. The shell 102 may include one or more doors that, when opened, enable an operator to access components within the electrical enclosure 100. Additionally, the shell 102 of the electrical enclosure 100 may be arc flash resistant. That is, the electrical enclosure 100 may be configured to contain an arc blast, should an arc blast occur. Further, the electrical enclosure 100 may include devices such as a programmable logic controller, switches, motor controls, inverters, rectifiers, and so forth disposed along and/or coupled with the bus system. Specifically, in the illustrated embodiment, the electrical enclosure 100 includes a wiring bay section 106 positioned between a pair of power drive sections 108, 110. The electrical enclosure 100 further includes an MCC plug-in unit 112. The MCC plug-in unit 112 may include transformers, variable frequency drivers, feeder circuit breakers, programmable controllers, and so forth. As discussed in detail below, the MCC plug-in unit 112 includes a translation mechanism configured to translate coupling features (i.e., a stab assembly) to engage and disengage a plurality of unit coupling features (i.e., line stabs) with one or more of the bus bars 114.

In the illustrated embodiment, the bus bars 114 pass along a back wall of the electrical enclosure 100 and through each of the enclosure sections (i.e., the wiring bay section 106 and each of the drive sections 108, 110). In other embodiments, the bus bars 114 may be arranged differently. For example, the bus bars 114 may extend horizontally along the back of the electrical enclosure 100 in one embodiment. Further, in the illustrated embodiment, a pair of ground bars 116 also passes horizontally through the enclosure sections. The bus bars 114 are made of conductive material (e.g., copper or aluminum) for use with the electrical enclosure 100. During operation, the set of bus bars 114 receives power and transmits the power to various components within the electrical enclosure 100 via couplings between the bus bars 114 and the various components. For example, the stab assembly of the MCC plug-in unit 112 engages with the bus bars 114 and transmits energy from the bus bars 114 to certain components within the electrical enclosure 100.

The stab assembly of the MCC plug-in unit 112 may be remotely actuated by an operator. Specifically, in one embodiment, the operator may control the MCC plug-in unit 112 with a control system 118, which is communicatively coupled to the MCC plug-in unit 112 and configured to regulate the operation of the MCC plug-in unit 112. The control system 118 may be accessible from outside the electrical enclosure 100 via a user interface 120 that enables configuration of the control system 118. Thus, the operator may control the operation of the MCC plug-in unit 112 by submitting commands through the user interface 120. For example, the user interface 120 may include a display and controls such as knobs, dials, buttons, switches, and so forth, to allow the operator to control and provide input to the MCC plug-in unit 112 via the control system 118. In certain embodiments, unit line stabs of a stab assembly in the MCC plug-in unit 112 may be withdrawn from the bus bars 114 based on instructions received from the user interface 120 or another remote communication feature. As will be appreciated, the remote operation of the MCC plug-in unit 112 (i.e., the retraction of the unit line stabs from the bus bars 114) allows the live voltage from the bus bars 114 to be removed from the MCC plug-in unit 112 without opening the electrical enclosure 100. Consequently, the arc flash resistance of the enclosure 100 is maintained during the translation of the stab assembly of the MCC plug-in unit 112. The display of the user interface 120 may also provide system feedback regarding the MCC plug-in unit 112. In particular, feedback relating to the engagement or the disengagement of the unit line stabs with the bus bars 114 may be provided to the operator through the display of the user interface 120. Alternatively, the control system 118 may be connected to another user interface remote from the electrical enclosure 100.

Figure 2:
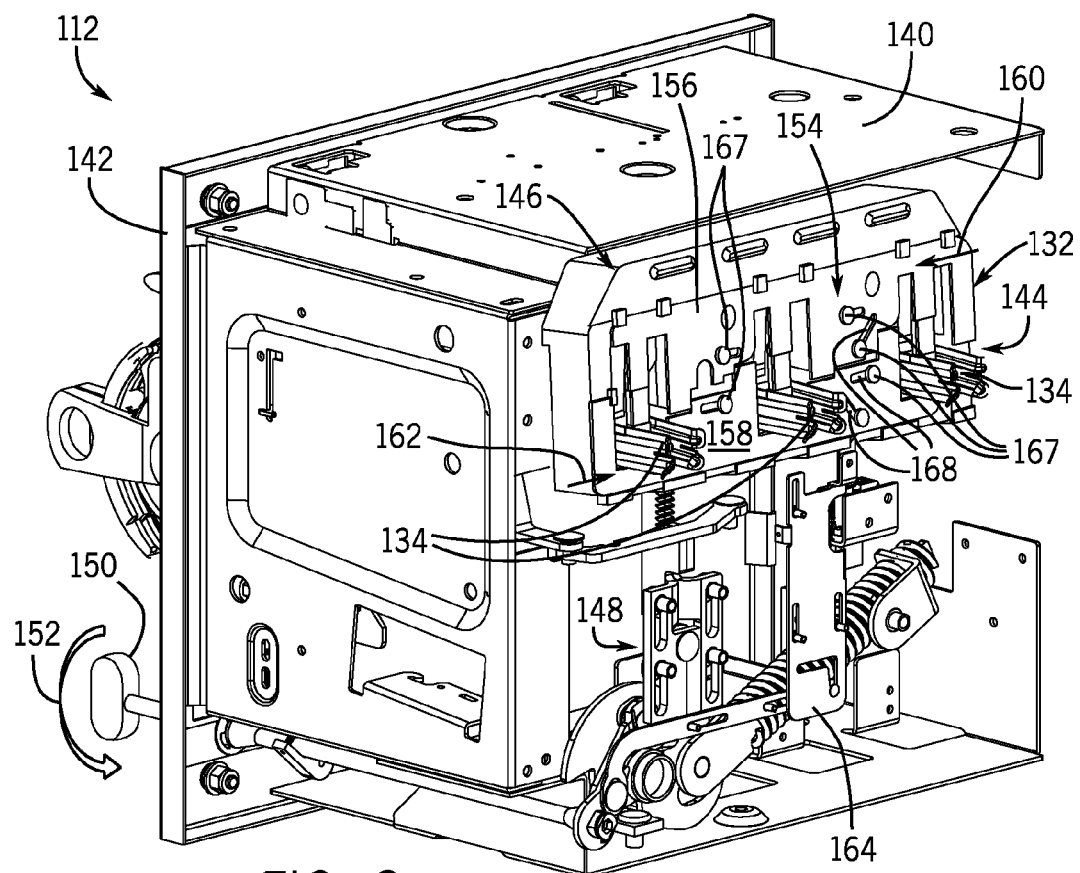
FIG. 2 is a perspective view of an MCC plug-in unit having a mechanical stab translation mechanism configured to rotate a stab assembly having a shaft and a plurality of unit line stabs between an engaged position and a disengaged position, in accordance with an embodiment of the present techniques.

FIG. 2 is a perspective view of an embodiment of the MCC plug-in unit 112 having a stab assembly 132 configured to engage a plurality of unit line stabs 134 with the bus bars 114. The MCC plug-in unit 112 has an enclosure 140 which at least partially defines the boundaries of MCC plug-in unit 112. The enclosure 140 may be an arc flash resistant enclosure configured to contain an arc blast within the MCC plug-in unit 112, should an arc blast occur. As shown, the enclosure 140 of the MCC plug-in unit 112 has a front panel 142. The MCC plug-in unit 112 further includes a back panel, however, in the illustrated embodiment, the back panel is removed from the MCC plug-in unit 112 to reveal the stab translation mechanism within the interior of the MCC plug-in unit 112. The back panel, when installed, is located along a back side 144 of the MCC plug-in unit 112. The front panel 142 of the MCC plug-in unit 112 may include a door or other opening through which the interior of the MCC plug-in unit 112 may be accessed. When the MCC plug-in unit 112 is disposed within the electrical enclosure 100, the back side 144 of the enclosure 140 faces the bus bars 114. Additionally, the front panel 142 of the enclosure 140 faces the front shell 102 of the electrical enclosure 100.

A housing cover 146 is disposed on the back side 144 of the enclosure 140. For example, the housing cover 146 may be formed from a glass-filled thermoset polyester or other suitable material. The housing cover 146 functions as an enclosure for the stab assembly 132, which includes the plurality of unit line stabs 134, wherein each of the plurality of unit line stabs 134 is configured to engage with one of the bus bars 114. In the illustrated embodiment, the stab assembly 132 is in the engaged or extended position and is extending through the housing cover 146.

The stab assembly 132 is actuated by a stab translation mechanism 148. In the illustrated embodiment, the stab translation mechanism 148 is spring loaded and is manually operated. For example, in the illustrated embodiment, the stab translation mechanism 148 includes a hand crank 150 as an actuator. Additionally, the hand crank 150 may be permanently coupled to the stab translation mechanism 148 or removable from the stab translation mechanism 148. For example, the hand crank 150 may be a T-handle Allen wrench or other drive tool. When rotated in a direction 152, the hand crank 150 translates the unit line stabs 134 of the stab assembly 132 from a disengaged position to an engaged position. Furthermore, as shown, the hand crank 150 extends through the front panel 142 of the MCC plug-in unit 112 and may likewise extend outside of the enclosure 100. Consequently, the hand crank 150 may be operated, and the stab translation mechanism 148 actuated, with a door or other opening in the front panel 142 or the enclosure 100 closed. In other embodiments, the stab translation mechanism 148 may include other actuators configured to translate the unit line stabs 134 of the stab assembly 132. For example, a user interface (e.g., user interface 120) positioned outside of the enclosure 100 may be employed as the actuator. Therefore, the arc flash resistance of the enclosure 140 and/or the enclosure 100 may be maintained during the actuation of the stab translation mechanism 148. In other embodiments, the stab translation mechanism 148 may be hydraulically, pneumatically, or electrically operated. As mentioned above, in some embodiments, the stab translation mechanism 148 may be coupled to the control system 118 to be remotely operated. For example, the stab translation mechanism 148 may be remotely operated over a network coupled to the control system 118 or using the user interface 120.

The housing cover 146 of the enclosure 140 further includes a shutter assembly 154 configured to prevent the stab assembly 132 and the unit line stabs 134 from making unintentional or undesired contact with the bus bars 114. In the illustrated embodiment, the shutter assembly 154 is in an opened position. However, the shutter assembly 154 may be actuated into a closed position, thereby physically preventing the stab assembly 132 and the unit line stabs 134 from moving from the disengaged position to the engaged position. In particular, guide pins 167 engaged with tracks 168 formed in upper and lower plates 156 and 158 guide the upper and lower plates 156 and 158 in directions 160 and 162, respectively. In this manner, the shutter assembly 154 will translate to the closed position. Similarly, when the hand crank 150 is rotated in a direction 152, the shutter assembly 154 creates apertures through which the unit line stabs 134 of the stab assembly 132 pass as the stab assembly 132 is translated from the disengaged position to the engaged position. This translates the shutter assembly 154 to the opened position shown. In certain embodiments, the shutter assembly 154 may be part of a disengagement feedback system. Specifically, the shutter assembly 154 may be configured to close an electrical circuit when the shutter assembly 154 is in the closed position. For example, the shutter transition plate 164 may be configured to contact an electrical contact when the shutter assembly 154 is in the closed position, thereby closing an electrical circuit and providing feedback to a user that the shutter assembly 154 is closed and the stab assembly 132 is in the disengaged position.

As mentioned above, upon actuation of the stab translation mechanism 148, the stab assembly 132 translates the plurality of unit line stabs 134 from the disengaged position to the engaged position. In the disengaged position, the unit line stabs 134 are retracted, and the shutter assembly 154 is in the closed position. In the engaged position, the shutter assembly 154 is in the open position and the unit line stabs 134 are extended to facilitate engagement with bus bars (e.g., bus bars 114).

Figure 3:
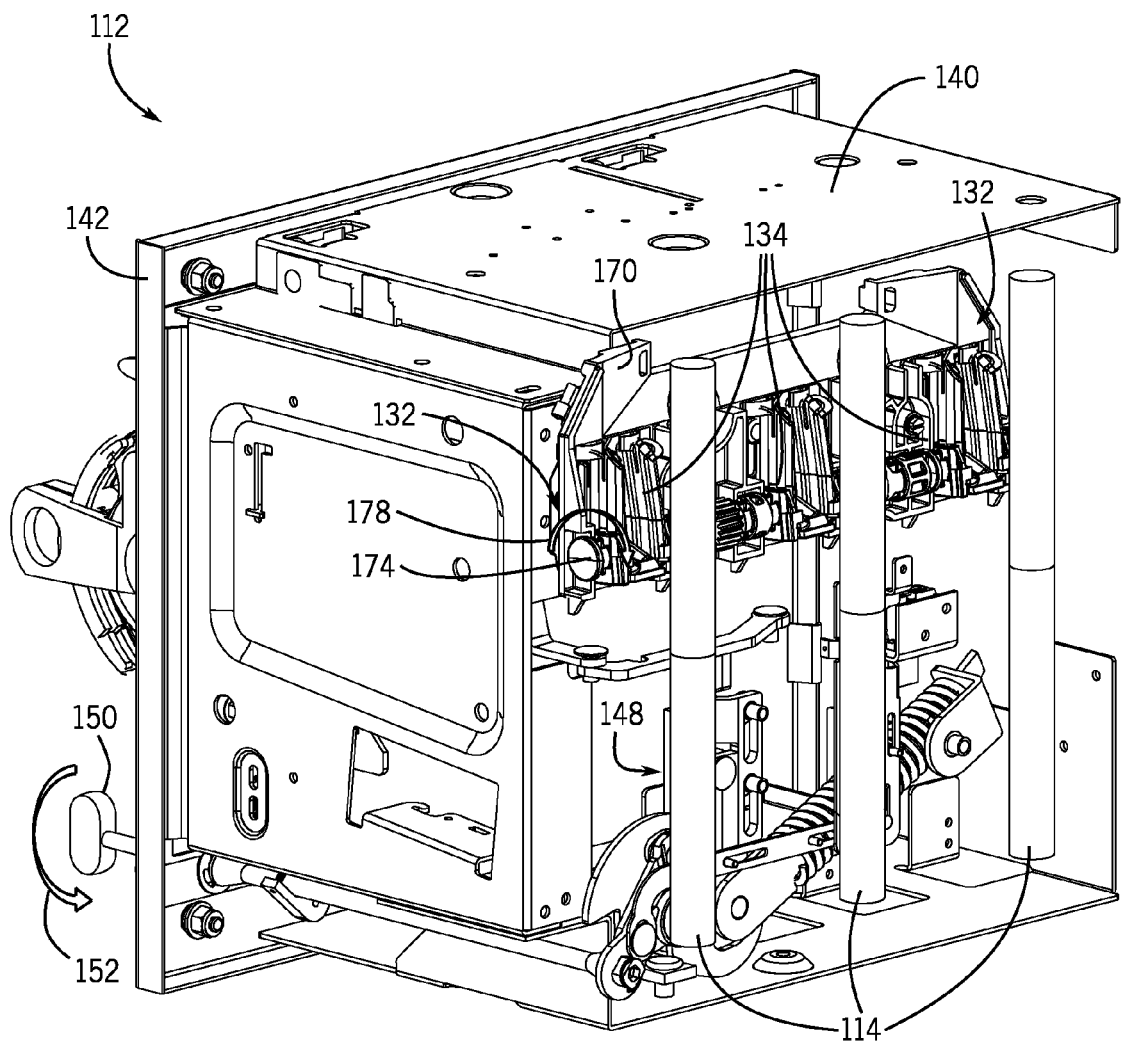
FIG. 3 is a partial perspective view of the MCC plug-in unit of FIG. 2, illustrating the stab assembly in a position where the unit line stabs are disengaged from vertical bus bars in accordance with an embodiment of the present techniques.

FIG. 3 is a perspective view of the MCC plug-in unit 112 of FIG. 2 with the housing cover 146 removed, thereby providing a clear view of a housing 170 supporting the stab assembly 132. The stab assembly 132 includes a stab shaft 174 which supports the plurality of unit line stabs 134. As shown, the stab assembly 132 is in the disengaged position. That is, the unit line stabs 134 are retracted from, and do not contact, the bus bars 114. More specifically, the unit line stabs 134 are in an upright position against the housing 170 of the MCC plug-in unit 112.

The stab assembly 132 shown in the illustrated embodiment has a rotational translation configuration. Specifically, when the hand crank 150 is rotated in the direction 152, the stab translation mechanism 148 will actuate the stab assembly 132. The actuation of the stab assembly 132 causes the stab shaft 174 to rotate in a rotational direction 178. As a result, the unit line stabs 134 of the stab assembly 132 are translated in the rotational direction 178 from the upright position shown in FIG. 3 (i.e., the disengaged position) to an extended position (i.e., the engaged position) such that the unit line stabs 134 engage or are configured to engage the bus bars 114. Specifically, as the unit line stabs 134 rotate in the rotational direction 178, each unit line stab 134 engages with a respective bus bar 114. As will be appreciated, the rotational translation configuration of the stab assembly 132 may utilize a limited amount of space between the enclosure 140 of the MCC plug-in unit 112 and the bus bars 114. Further, the rotational translation configuration conserves horizontal space within the MCC plug-in unit 112 relative to a linear activation. In other embodiments, the stab assembly 132 may have other translation configurations. For example, the stab assembly 132 may have a linear translation configuration.

Figure 4:
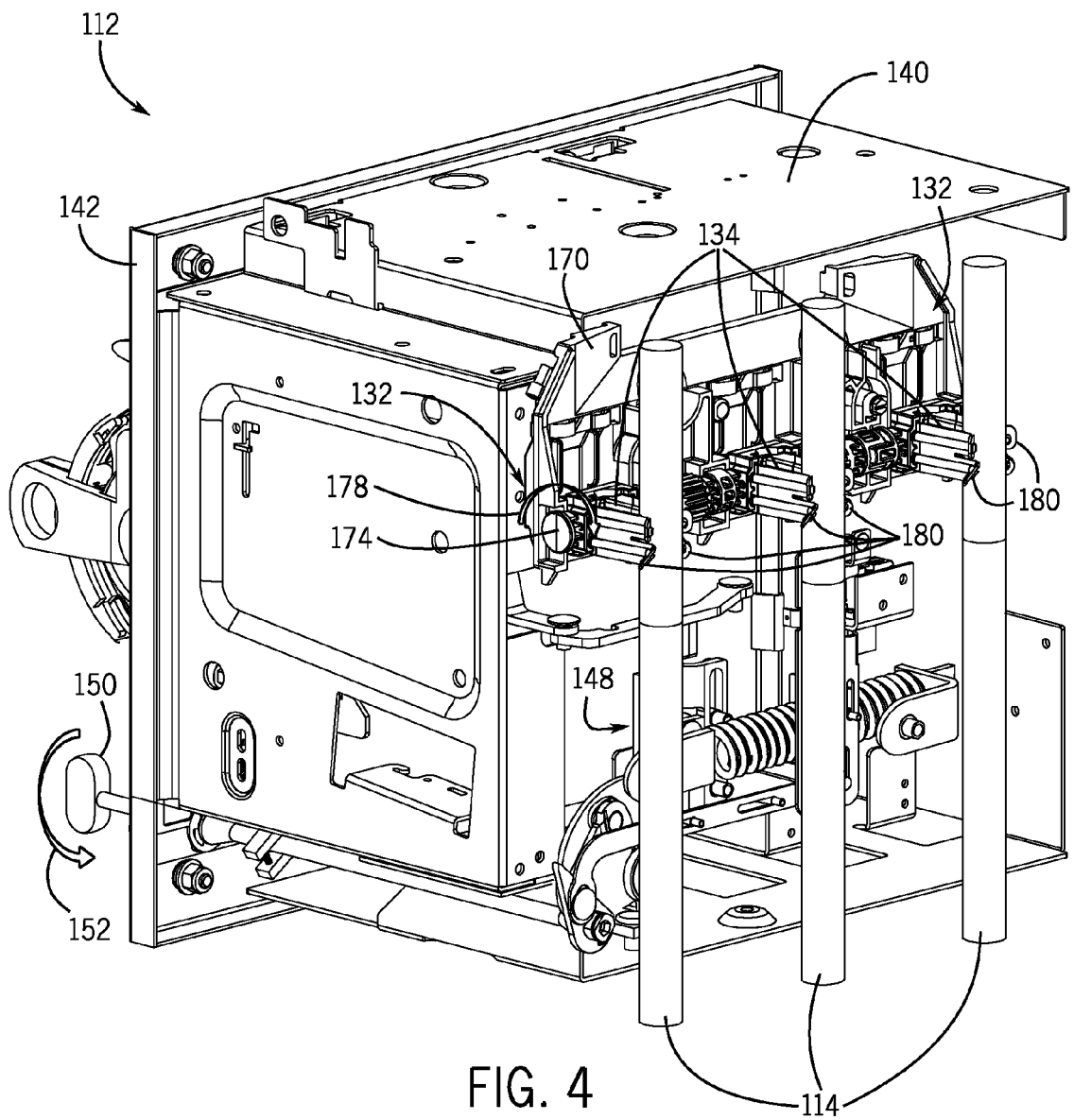
FIG. 4 is a partial perspective view of the MCC plug-in unit of FIG. 3, illustrating the stab assembly in a position where the unit line stabs are engaged with vertical bus bars in accordance with an embodiment of the present techniques.

FIG. 4 is a perspective view of the MCC plug-in unit 112 of FIG. 3 with the housing cover 146 removed, illustrating the stab assembly 132 in the engaged position. Specifically, the unit line stabs 134 of the stab assembly 132 are engaged with the bus bars 114. As shown, in the engaged position, each unit line stab 134 is engaged with a respective one of the bus bars 114. Specifically, each unit line stab 134 has contact arms 180 which abut the bus bars 114 when the stab assembly 132 is in the engaged position. Indeed, each unit line stab 134 has two contact arms 180 which receive and abut a respective bus bar 114 on opposite sides of the bus bar 114. In other embodiments, different contact arm arrangements may be utilized. As mentioned above, power (i.e., current and live voltage) is transferred from the bus bars 114 to the MCC plug-in unit 112 through the unit line stabs 134. The power transferred to the MCC plug-in unit 112 is then transmitted to various components within the electrical enclosure 100. While the illustrated embodiment includes three unit line stabs 134, in other embodiments the MCC plug-in unit 112 may include one or a plurality of unit line stabs 134.

Figure 5:
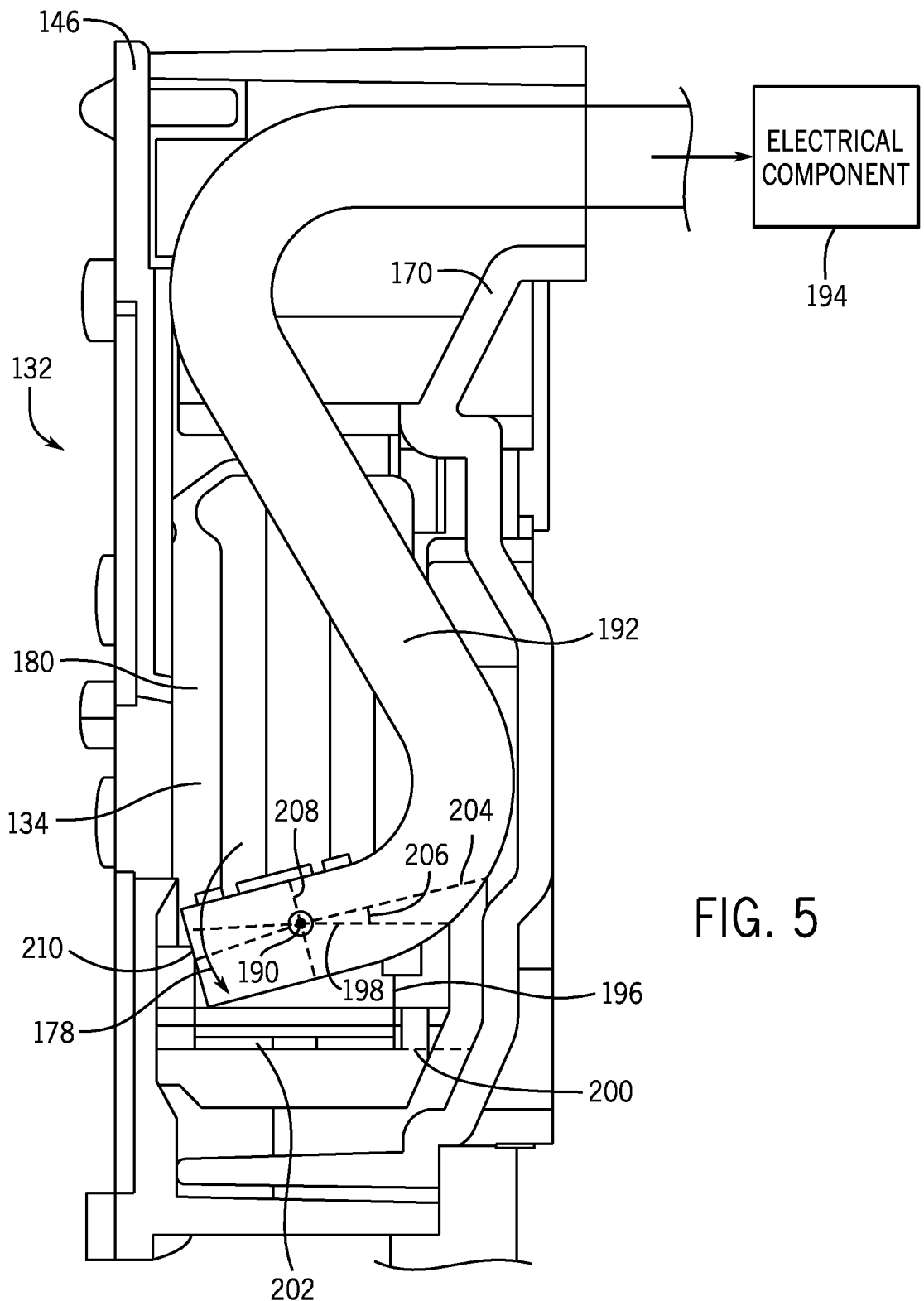
FIG. 5 is a cross sectional side view of an MCC plug-in unit, illustrating a retracted unit line stab coupled with wire for transmitting high current power from a bus bar to an electrical component, in accordance with an embodiment of the present techniques.

FIG. 5 is a side cross sectional view of an embodiment of the stab assembly 132 within the housing cover 146 of the MCC plug-in unit 112. In the illustrated embodiment, the unit line stab 134 is in a retracted position within the enclosure formed by the housing cover 146. That is, the unit line stab 134 is out of contact with its respective bus bar 114. FIG. 5 illustrates a rotational axis 190 of the stab shaft 174 (not shown). The translation mechanism 148 discussed above with respect to FIGS. 2 and 3 may urge rotation of the unit line stab 134 in the rotational direction 178 about this rotational axis 190. The rotational axis 190 is a longitudinal axis of the stab shaft 174 about which the stab shaft 174 is rotated to translate the unit line stab 134 from the extended position (e.g., engaged with the bus bars 114) to the retracted position (e.g., disengaged from the bus bars 114).

The illustrated embodiment also includes a wire 192 configured to transmit electricity from the respective bus bar 114 to an electrical component 194 when the unit line stab 134 is engaged with the bus bar 114. The electrical component 194 may be disposed in the enclosure 100. The unit line stab 134 includes a lug block 196, and the wire 192 is coupled to the unit line stab 134 via the lug block 196. When the unit line stab 134 is engaged with its corresponding bus bar 114, electrical current may pass from the bus bar 114, through the contact arms 180, the lug block 196, and the wire 192 to one or more electrical components 194. Although the term "wire" is used throughout the following discussion, the term may generally refer to a somewhat flexible cable of several wires for carrying an electrical current.

The stab assembly 132 may be configured for use in high current applications. That is, the stab assembly 132 may transmit high current electrical power from the bus bars 114 to the one or more electrical components 194. High current may refer to an electrical current within a range of approximately 70 amps to 360 amps. It should be noted, however, that the stab assembly 132 may be used to transmit electrical power within other current ranges. In order to transmit the relatively high current power from the unit line stab 134 to the electrical component 194, the wire 192 may have a substantially large wire gauge, or multiple smaller gauges may be employed. For example, the wire 192 may have a wire gauge of approximately #8 through 4/0. Due to the size of the wire 192, it may be desirable to utilize the lug block 196 for connecting the wire 192 to the contact arms 180 of the unit line stab 134. The lug block 196 may be crimped to hold the wire 192 within the lug block 196. It should be noted that a similar design of the lug block 196 may be employed in systems with smaller wire.

The lug block 196 may hold the wire 192 within the unit line stab 134 at an incline relative to a base axis 198 of the lug block 196. The base axis 198 is parallel to a plane 200 where the lug block 196 meets a base portion 202 of the unit line stab 134. Thus, in the illustrated embodiment, the base axis 198 is oriented horizontally when the unit line stab 134 is in the retracted position (as shown), and the base axis 198 may be oriented vertically when the unit line stab 134 is rotated to the extended position (as shown in FIG. 4). The lug block 196 may include an opening along a wire axis 204 through which the wire 192 is received into the lug block 196. The wire 192 is held in the lug block 196 along this wire axis 204, and the wire axis 204 may be oriented at an angle 206 relative to the base axis 198. This angle 206 may allow the relatively large gauge wire 192 to fit within the enclosure formed by the housing cover 146 of the MCC plug-in unit 112. Specifically, the wire 192 may fit between the housing cover 146 and the housing 170 when the unit line stab 134 is oriented in the extended position as well as the retracted position. Thus, the angled lug block 196 may facilitate a relatively compact arrangement of the stab assembly 132 within the MCC plug-in unit 112.

In the illustrated embodiments, the unit line stab 134 is designed to facilitate alignment of the wire 192 with the rotational axis 190 of the stab assembly 132. Because the wire gauge is relatively large, the wire 192 may experience undesirable lengthening or foreshortening during rotational transitions of the unit line stab 134 if the wire 192 is attached to the unit line stab 134 far from the rotational axis 190. Such movement of the wire 192 through the MCC plug-in unit 112 may lead to undesirable inefficiencies in operation of the MCC plug-in unit and additional cost to replace wires 192 that may become worn. To reduce the amount of foreshortening and lengthening of the wire 192, the lug block 196 is designed to hold the wire 192 such that the wire 192 is approximately centered on the rotational axis 190. That is, the lug block 196 may hold the wire 192 such that the wire 192 intersects the rotational axis 190 at approximately a central point of a cross section 208 of the wire 192. This central point may be within approximately 0.1 cm of the centroid of the wire's cross section. In some embodiments, the lug block 196 may be configured such that the wire 192 intersects the rotational axis 190 at approximately a central point of a cross section 208 at a distal end 210 of the wire 192, such that the wire 192 terminates in the lug block 196 at a position aligned with the rotational axis 190.

In presently disclosed embodiments, the stab shaft 174 is movable to facilitate engagement or disengagement of the unit line stab 134 with the bus bar 114. This movement may be via rotation of the unit line stab 134 about the rotational axis 190, as described above. However, in other embodiments, the engagement and disengagement of the unit line stab 134 with the bus bar 114 may occur via linear translation of the stab shaft 174 toward or away from the bus bar 114. In such embodiments, the unit line stab 134 is designed to facilitate alignment of the wire 192 with an axis (e.g., axis 190) of the stab shaft 174.

Figure 6:
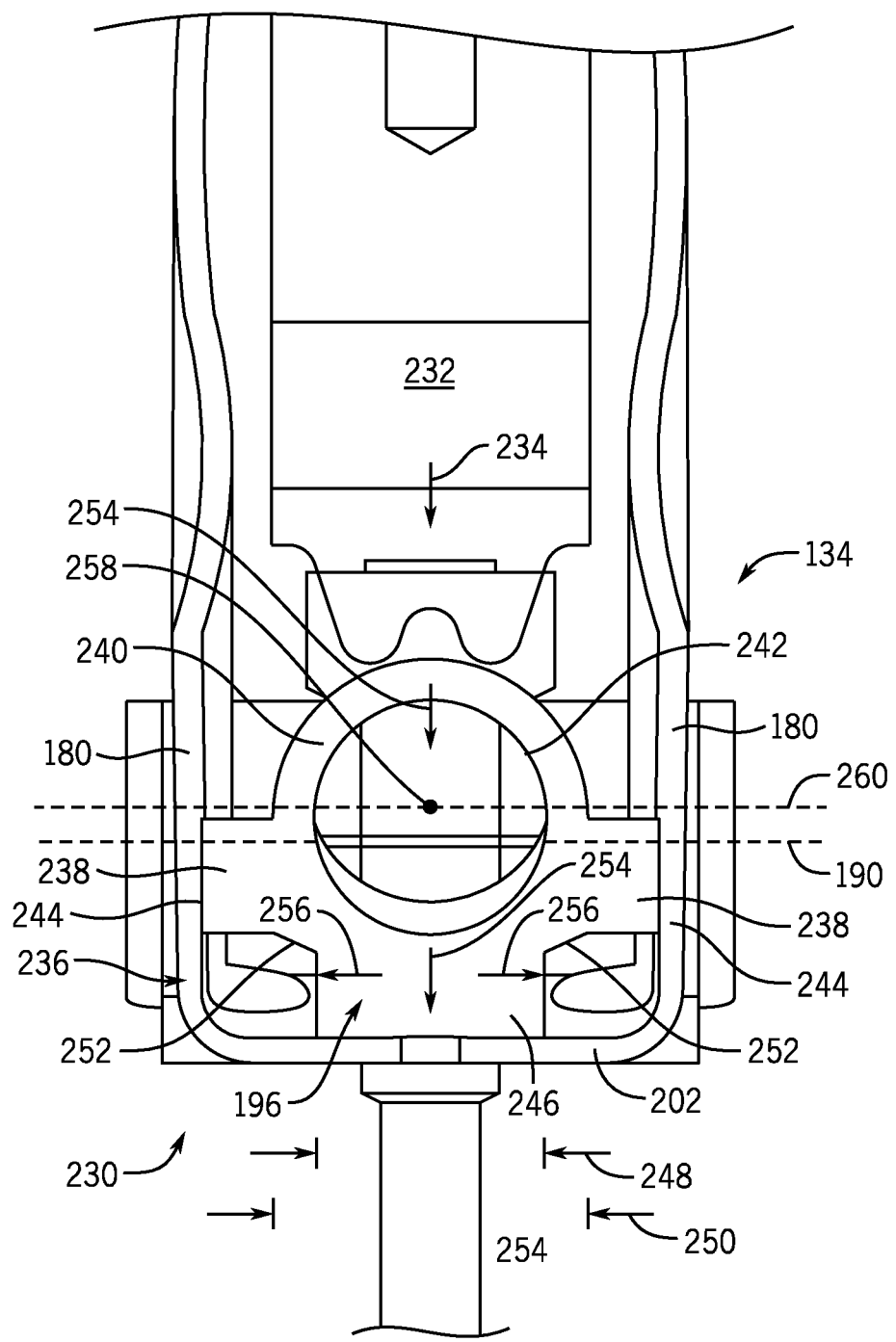
FIG. 6 is a back view of a unit line stab, illustrating a lug configured to be crimped to hold a wire, in accordance with an embodiment of the present techniques.
Figure 11:
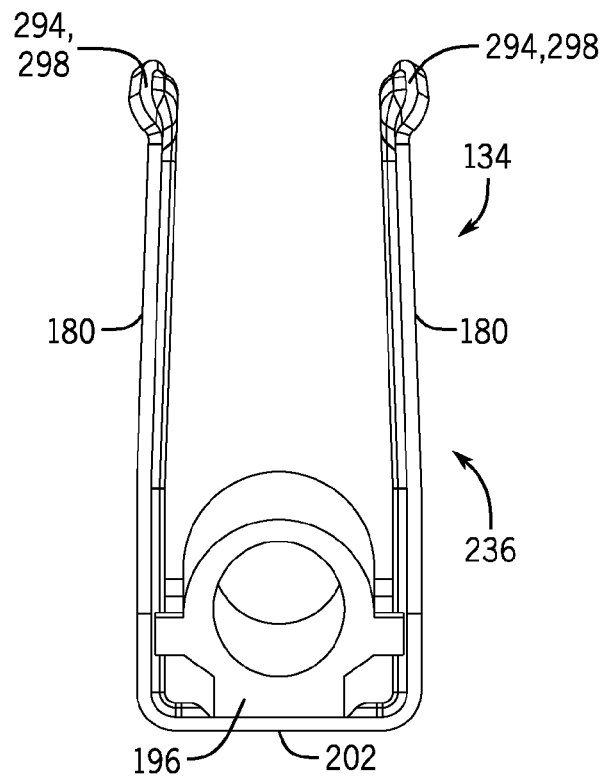
FIG. 11 is a back view of the unit line stab of FIG. 7, in accordance with an embodiment of the present techniques.
Figure 12:
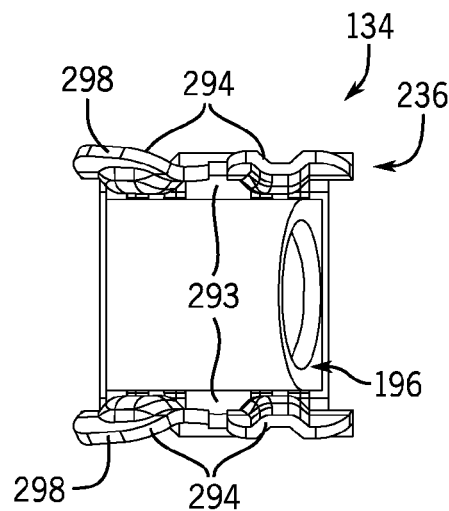
FIG. 12 is a top view of the unit line stab of FIG. 7, in accordance with an embodiment of the present techniques.
Figure 13:
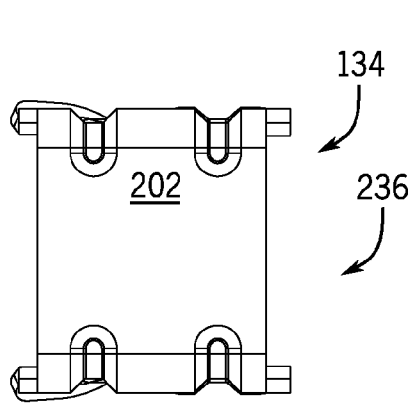
FIG. 13 is a bottom view of the unit line stab of FIG. 7, in accordance with an embodiment of the present techniques.

The lug block 196 may be crimped once the wire 192 is inserted through the opening in the lug block 196, and the crimped lug block 196 holds the wire 192 throughout its use in the MCC plug-in unit 112. FIG. 6 illustrates an embodiment of the unit line stab 134 being crimped via a crimping mechanism 230. Although the wire 192 is not shown in the illustrated embodiment, the crimping mechanism 230 may be used to crimp the lug block 196 with the wire 192 inside, thereby coupling the wire 192 to the unit line stab 134. The crimping mechanism 230 may hold the unit line stab 134, while bringing a crimper 232 into contact with the lug block 196. In the illustrated embodiment, the crimper 232 is lowered onto the lug block 196, as shown by an arrow 234.

It should be noted that in some embodiments, the unit line stab 134 may be constructed from two separate pieces. In the illustrated embodiment, for example, the unit line stab 134 includes a stab piece 236, which includes the two contact arms 180 and the base portion 202 disposed between the contact arms 180. The stab piece 236 is generally U-shaped. Although in the illustrated embodiment, the stab piece 236 has two contact arms 180, in other embodiments the stab piece 236 may have a single contact arm configured to contact the bus bar 114. The stab piece 236 may be coupled with the stab shaft 174 (not shown) along the base portion 202 of the stab piece 236, such that the contact arms 180 extend outward for engagement with the bus bar 114. In some embodiments, the base portion 202 may be coupled to the stab shaft 174, directly or indirectly, to facilitate rotation of the contact arms 180 as the stab shaft 174 rotates.

The unit line stab 134 also includes the lug block 196, which is a separate piece in the illustrated embodiment. The lug block 196 may be made of copper or any other suitable conductive material, or combination of materials. The lug block 196 is coupled to the base portion 202 of the stab piece 236. In some embodiments, the lug block 196 may be brazed to the base portion 202, or the lug block 196 may be coupled to the stab piece 236 via one or more fasteners.

The lug block 196 may include features to aid in the crimping process. These features may facilitate the crimping of the lug block 196 and the wire 192 such that the wire 192 is substantially centered on the rotational axis 190 of the stab shaft 174. In addition, these features may allow the wire 192 to maintain a desired cross sectional area for carrying the relatively high current toward the electrical component 194.

In the illustrated embodiment, the lug block 196 may include a pair of wings 238 that extend from a lug body 240 of the lug block 196. The lug body 240 may include an annular portion of the lug block 196 with an opening 242 for receiving and holding the wire 192. The wings 238 may extend outward from opposite sides of the lug body 240 toward the contact arms 180. The wings 238 may include separate copper blocks that are coupled with the lug body 240, or the lug block 196 may be a single piece shaped to include the wings 238. The wings 238 may center the lug block 196 within the stab piece 236, between the two contact arms 180. More specifically, exterior walls 244 of the wings 238 are configured to abut the contact arms 180 such that the wings 238 effectively brace the lug body 240 relative to the contact arms 180 when the crimping force is applied via the crimper 232. That is, the wings 238 provide additional structural support to the sides of the lug body 240, holding the sides of the lug body 240 in direct contact with the contact arms 180. The wings 238 bridge a gap that would otherwise exist between the lug body 240 and the contact arms 180. This added structural support may keep the lug body 240 from deforming outward toward the contact arms 180 in response to the crimping force. Instead of deforming laterally toward the contact arms 180, the lug body 240 may deform toward the base portion 202 of the unit line stab 134 when the crimping force is applied to the lug block 196. The wings 238 may also facilitate self-alignment of the lug body 240 relative to the contact arms 180.

In addition, the lug block 196 may include a lug base 246 that is specifically shaped to enable the desired deformation of the lug block 196 during crimping. Specifically, a dimension 248 of the lug base 246 in the direction between and substantially perpendicular to the contact arms 180 may be less than a dimension 250 of the lug body in the same direction. For purposes of discussion, dimensions in this direction may be referred to generally as the width. That is, the width 248 of the lug base 246 may be smaller than the width 250 of the lug body 240. Between the lug body 240 and the lug base 246, the lug block 196 may include sloped walls 252 to transition the lug block 196 from the larger width 250 of the lug body 240 to the smaller width 248 of the lug base 246. When a crimping force is applied via the crimper 232, the lug body 240 may be pushed toward the base portion 202 of the stab piece 236, as shown by arrows 254. In addition, the lug block 196 may deform to fill a space between the lug base 246, the sloped walls 252, the wings 238, and the stab piece 236, as shown by arrows 256.

In the illustrated embodiment, the crimping force has not yet been applied. A center 258 of the opening 242 in the lug body 240 is aligned with an axis 260. This axis 260 is located above the rotational axis 190 of the stab shaft 174. This is because the crimping force applied by the crimper 232 will naturally crush a portion of the lug block 196, thereby lowering the center 258 of the lug body 240. When the crimper 232 applies the crimping force, the force may secure the lug block 196 to the wire 192 disposed in the opening 242. In addition, the crimping force may lower the position of the lug body 240 such that the center 258 is more closely aligned with the rotational axis 190, as desired. This may reduce foreshortening and lengthening of the wire 192 as the unit line stab 134 is transitioned between extended and retracted positions. The shaping of the lug block 196 (e.g., wings 238, lug base 246, and sloped walls 252) may facilitate a deformation of the lug block 196 that allows the application of the crimping force to secure the wire 192 within the lug block 196, center the wire 192 along the shaft axis 190, and maintain a desired cross sectional area of the wire 192.

FIG. 7 is a perspective view of an embodiment of the unit line stab 134 prior to the application of the crimping force (as shown in FIG. 6) to secure the wire 192 within the lug block 196 of the unit line stab 134. FIGS. 8, 9, 10, 11, 12, and 13 show left side, right side, front, back, top, and bottom views of the unit line stab 134 of FIG. 7, respectively. As described above, the unit line stab 134 includes the stab piece 236 and the lug block 196, which may be separate pieces coupled together to form the unit line stab 134. In other embodiments, the unit line stab 134 may be constructed from a single piece of material.

In certain embodiments, the stab piece 236 is made from an electrically conductive material, such as tin-plated copper, to enable the unit line stab 134 to transmit electricity from the bus bar 114 to the various components within the electrical enclosure 100. As mentioned above, the stab piece 236 includes the contact arms 180 configured to abut the bus bar 114 when the stab assembly 132 is in the engaged position shown in FIG. 4. The contact arms 180 are coupled to the base portion 202, and the base portion 202 is secured to a segment of the stab shaft 174. In some embodiments, the stab piece 236 may include backup springs (not shown) disposed on an outer surface 290 of the stab piece 236. Specifically, backup springs may be disposed in recesses 292 formed in the contact arms 180 of the stab piece 236, in order to provide support to the contact arms 180 throughout use of the unit line stab 134. These recesses 292 may also define grooves 293 along inner surfaces 295 of the contact arms 180. The grooves 293 may be used for aligning the lug block 196 with the stab piece 236, as discussed in detail below.

Furthermore, the contact arms 180 of the stab piece 236 may have angled contact prongs 294 configured to receive the bus bar 114 as the stab assembly 132 is rotated from the disengaged position to the engaged position. For example, in the illustrated embodiment, the unit line stab 134 may rotate in a direction 296 from the disengaged position to the engaged position. As the unit line stab 134 rotates in the direction 296, the contact prongs 294 to first contact and receive the bus bar 114 will be the back contact prongs 298. As shown, the back contact prongs 298 are angled outward and downward such that the back contact prongs 298 will contact and receive the bus bar 114 as the unit line stab 134 rotates in the direction 296.

Figure 14:
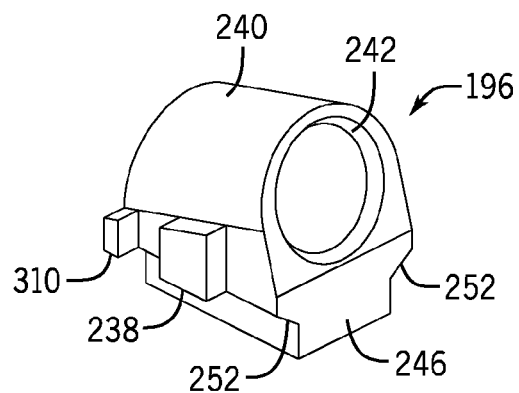
FIG. 14 is a perspective view of the lug block of FIG. 7, in accordance with an embodiment of the present techniques.
Figure 15:
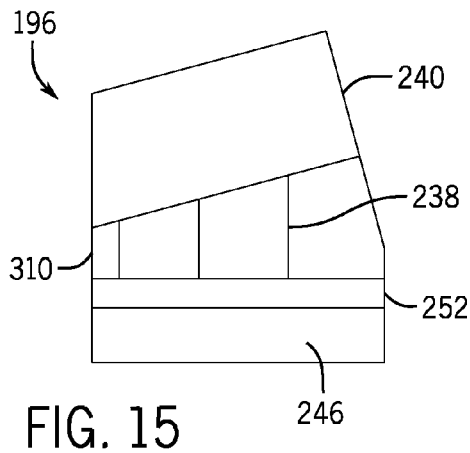
FIG. 15 is a left side view of the lug block of FIG. 13, in accordance with an embodiment of the present techniques.
Figure 16:
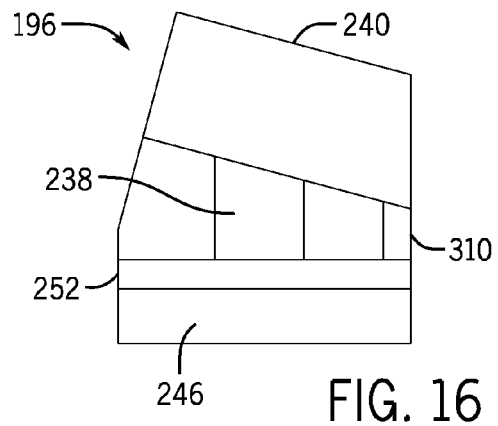
FIG. 16 is a right side view of the lug block of FIG. 13, in accordance with an embodiment of the present techniques.
Figure 17:
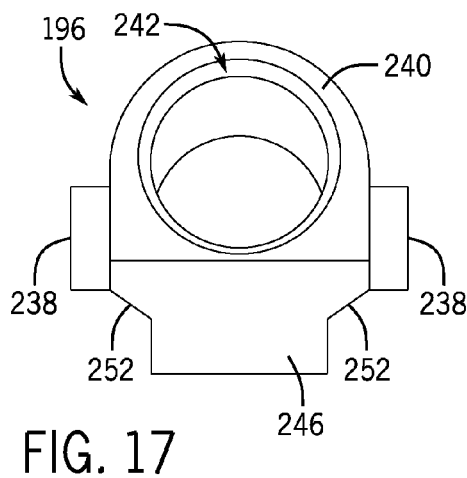
FIG. 17 is a front view of the lug block of FIG. 13, in accordance with an embodiment of the present techniques.
Figure 18:
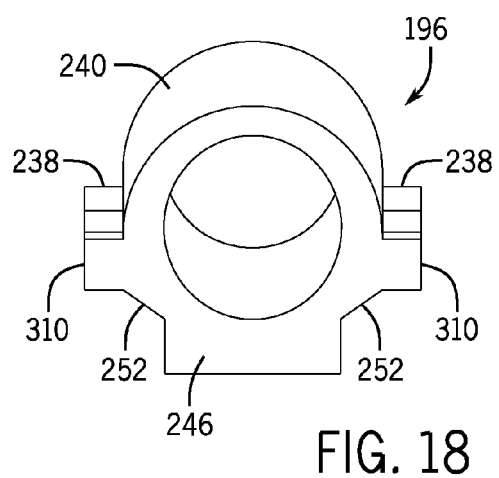
FIG. 18 is a back view of the lug block of FIG. 13, in accordance with an embodiment of the present techniques.
Figure 19:
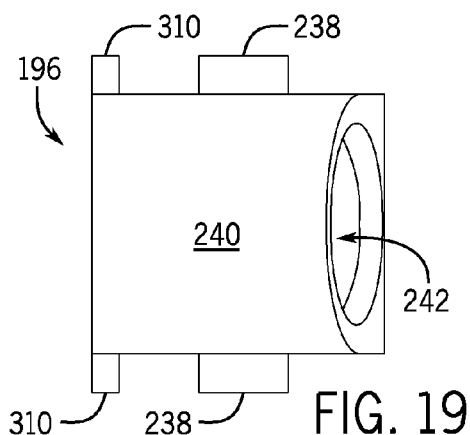
FIG. 19 is a top view of the lug block of FIG. 13, in accordance with an embodiment of the present techniques.
Figure 20:
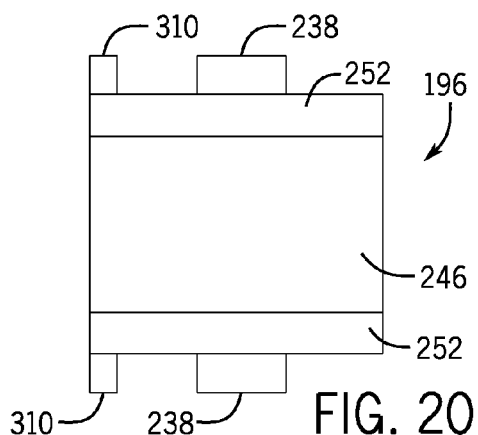
FIG. 20 is a bottom view of the lug block of FIG. 13, in accordance with an embodiment of the present techniques.

FIG. 14 is a perspective view of the lug block 196 that may be brazed or otherwise connected to the stab piece 236 to form the unit line stab 134 of FIG. 7. As discussed above, the lug block 196 includes wings 238 for bracing the lug block 196 between the contact arms 180 of the stab piece 236, providing structural support and alignment for the lug block 196. In addition, the illustrated lug block 196 includes a second pair of wings 310 disposed on either side of the lug body 240. In FIG. 14, only one each of the wings 236 and the wings 310 are visible. The wings 310 may be used to guide the lug block 196 into position between the contact arms 180 of the stab piece 236. More specifically, the wings 310 may be configured to abut the grooves 293 of the contact arms 180, thereby centering the lug block 196 as it is placed on and secured to the stab piece 236. These wings 310 may be relatively smaller than the wings 238, since the wings 310 may be used predominantly for positioning the lug block 196, and not for bracing the lug block 196 when the crimping force is applied. In some embodiments, the lug block 196 may feature a single pair of wings 238 that are configured to brace the lug block 196 during crimping as well as to position the lug block 196 prior to its connection to the stab piece 236.

The lug block 196 may include features such as the lug body 240 with the inclined opening 242, the wings 238 and 310, the lug base 246, and the sloped walls 252. All of these features may be constructed as a single body of material. In some embodiments, for example, the lug block 196 may be machined from a single block of conductive material, such as copper. In other embodiments, the lug block 196 may be cast to form the specific desired shape.

FIGS. 15, 16, 17, 18, 19, and 20 are left side, right side, front, back, top, and bottom views of the lug block of FIG. 14. Some of these figures show both of the wings 310 extending outward from the lug body 240 toward opposite sides for engagement with the contact arms 180 of the stab piece 236. It should be noted that other arrangements of the components shown may be possible in other embodiments of the lug block 196. For example, although the illustrated opening 242 through the lug body 240 is substantially circular to receive the relatively thick wire 192, in other embodiments the opening 242 may be other shapes, such as an oval, or some other shape appropriately sized to receive the wire 192. In addition, there may be more or fewer pairs of wings 238 and 310 than shown in the illustrated embodiment. For example, the lug block 196 may include one, three, four, five, or more pairs of wings extending from the lug body 240 to engage the contact arms 180 for aligning and/or bracing the lug block 196 within the stab piece 236. Specific dimensions of the lug base 246, sloped walls 252, and wings 238 and 310 may be determined based on the amount of crimping force to be applied to the lug block 196, and the positioning of the unit line stab 134 relative to the stab shaft 174, among others factors.

As noted above, some embodiments of the presently disclosed unit line stab 134 may be constructed from a single piece of material. FIG. 21 illustrates one such embodiment of the unit line stab 134. The unit line stab 134, which is one piece in the illustrated embodiment, includes the features of the lug block 196 situated within the stab piece 236. The unit line stab 134 may be forged from a single piece of material. After such forging, the contact arms 180 of the unit line stab 134 may be bent into a desired, relatively upright position from a position extended outward from the lug block 196. This bending of the contact arms 180 into position is indicated by arrows 330. In such an embodiment, the wings 310 of the lug block 196 may not be necessary, as the lug block 196 is already centered between and coupled to the contact arms 180.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A stab for use in a plug-in assembly, comprising:
a stab piece configured to be rotated into and out of engagement with a bus bar via rotation about a rotational axis, the stab piece comprising:
one or more contact arms of the stab piece configured to engage the bus bar; and
a base portion of the stab piece coupled to the one or more contact arms; and
a lug coupled to the stab piece and configured to receive a wire for transmitting power from the bus bar to an electrical component;
wherein the lug is configured to be deformed around the wire to hold the wire when a crimping force is applied to the lug, wherein the lug is configured to hold the wire at a position approximately centered on an axis when the lug is deformed by the crimping force, the stab piece comprises two contact arms and the base portion coupled between the two contact arms, the lug comprises a lug body having an opening for receiving and holding the wire, wherein the lug is configured such that the lug body is deformed toward the base portion of the stab piece when the crimping force is applied to the lug, and the lug comprises a lug base coupled with the base portion of the stab piece, wherein a width of the lug base is smaller than a width of the lug body such that the lug body is deformed toward the base portion when the crimping force is applied to the lug.

2. The stab of claim 1, wherein the lug comprises a plurality of wings extending from the lug body, and wherein the wings are configured to interface with the contact arms to brace the lug between the contact arms when the crimping force is applied to the lug.

3. The stab of claim 1, wherein the lug comprises a plurality of wings extending from the lug body, wherein the wings are configured to interface with the two contact arms to allow self-alignment of the lug between the contact arms.

4. The stab of claim 1, comprising a single piece comprising the stab piece and the lug.

5. The stab of claim 1, wherein the stab piece and the lug are two separate pieces that are coupled together.

6. The stab of claim 1, wherein the base portion of the stab piece is configured to be coupled to a stab shaft for rotating the stab about the axis to transition the stab between engagement and disengagement with the bus bar.

7. A plug-in unit, comprising:
at least one stab configured to engage a bus, wherein the at least one stab comprises a stab piece having one or more contact arms configured to engage a bus bar of the bus and a base portion coupled to the one or more contact arms, and a lug coupled to the stab piece, wherein the lug is disposed around and coupled to wire to transmit power from the bus bar to an electrical component; and
a stab shaft coupled with the base portion of the at least one stab, wherein the stab shaft is configured to be movable for transitioning the at least one stab between engagement and disengagement with the bus bar;
wherein the lug is configured to hold the wire at a position approximately centered on an axis of the stab shaft, and wherein the lug is aligned with the contact arms via wings extending from the lug to fit into grooves formed in the one or more contact arms.

8. The plug-in unit of claim 7, wherein the stab shaft is configured to be rotated about a rotational axis to rotationally transition the at least one stab between engagement and disengagement with the bus bar, and wherein the lug is configured to hold the wire at a position approximately centered on the rotational axis of the stab shaft.

9. The plug-in unit of claim 7, wherein the lug is crimped to hold the wire at the position approximately centered on the axis of the stab shaft.

10. The plug-in unit of claim 7, wherein the lug is disposed around and coupled to wire with a gauge of approximately #8 to 4/0.

11. The plug-in unit of claim 7, wherein the plug-in unit is configured to provide power of approximately 70 to 360 amps from the bus bar to the electrical component.

12. A method for assembling a plug-in unit, comprising:
disposing a wire in an opening of a lug, wherein the wire is configured to transmit power from a bus bar to an electrical component, and wherein the lug forms part of a stab configured to engage the bus bar for transmitting the power from the bus bar to the wire, wherein the stab is configured to be rotated into or out of engagement with the bus bar via rotation about a rotational axis, wherein the stab comprises a stab piece and the lug, the lug being coupled to the stab piece, and wherein the stab piece comprises two contact arms configured to engage the bus bar and a base portion of the stab piece coupled between the two contact arms;
crimping the lug to couple the lug with the wire such that the wire is approximately centered on the rotational axis;
coupling the lug to the base portion of the stab piece; and
aligning the lug with the stab piece by abutting wings extending from the lug with grooves formed in the contact arms.

13. The method of claim 12, comprising bracing the lug between the contact arms via the wings extending from a lug body of the lug, such that the lug deforms toward the base portion during crimping.

14. The method of claim 12, wherein a width of the lug where the lug is coupled to the base portion is less than a width of the lug where the wire is disposed in the opening.

15. The method of claim 12, comprising forging the stab from a single piece of material, and bending the contact arms to a substantially parallel position.

16. A stab for use in a plug-in assembly, comprising:
a stab piece configured to be rotated into and out of engagement with a bus bar via rotation about a rotational axis, the stab piece comprising:
one or more contact arms of the stab piece configured to engage the bus bar; and
a base portion of the stab piece coupled to the one or more contact arms; and
a lug coupled to the stab piece and configured to receive a wire for transmitting power from the bus bar to an electrical component;
wherein the lug is configured to be deformed around the wire to hold the wire when a crimping force is applied to the lug, wherein the lug is configured to hold the wire at a position approximately centered on an axis when the lug is deformed by the crimping force, wherein the stab piece comprises two contact arms and the base portion coupled between the two contact arms, the lug comprises a lug body having an opening for receiving and holding the wire, wherein the lug is configured such that the lug body is deformed toward the base portion of the stab piece when the crimping force is applied to the lug, and the stab piece comprises two contact arms and the base portion is coupled between the contact arms, wherein the lug comprises a plurality of wings extending from the lug body, and wherein the wings are configured to interface with the contact arms to brace the lug between the contact arms when the crimping force is applied to the lug.

17. A method for assembling a plug-in unit, comprising:
disposing a wire in an opening of a lug, wherein the wire is configured to transmit power from a bus bar to an electrical component, and wherein the lug forms part of a stab configured to engage the bus bar for transmitting the power from the bus bar to the wire, wherein the stab is configured to be rotated into or out of engagement with the bus bar via rotation about a rotational axis, wherein the stab comprises a stab piece and the lug, the lug being coupled to the stab piece, and wherein the stab piece comprises two contact arms configured to engage the bus bar and a base portion of the stab piece coupled between the two contact arms;
crimping the lug to couple the lug with the wire such that the wire is approximately centered on the rotational axis, wherein crimping the lug deforms the lug toward the base portion and not toward the contact arms; and
bracing the lug between the contact arms via wings extending from a lug body of the lug, such that the lug deforms toward the base portion during crimping.

18. A method for assembling a plug-in unit, comprising:
disposing a wire in an opening of a lug, wherein the wire is configured to transmit power from a bus bar to an electrical component, and wherein the lug forms part of a stab configured to engage the bus bar for transmitting the power from the bus bar to the wire, wherein the stab is configured to be rotated into or out of engagement with the bus bar via rotation about a rotational axis, wherein the stab comprises a stab piece and the lug, the lug being coupled to the stab piece, and wherein the stab piece comprises two contact arms configured to engage the bus bar and a base portion of the stab piece coupled between the two contact arms; and
crimping the lug to couple the lug with the wire such that the wire is approximately centered on the rotational axis, wherein a width of the lug where the lug is coupled to the base portion is less than a width of the lug where the wire is disposed in the opening.

* * * * *